United States Patent
Gopinath et al.

(10) Patent No.: US 11,385,933 B2
(45) Date of Patent: Jul. 12, 2022

(54) PRIORITY DETERMINATION OF COMPUTER RESOURCES BASED ON CONFIGURED DYNAMIC LOGIC

(71) Applicant: Kyndryl, Inc., New York, NY (US)

(72) Inventors: Arun K. Gopinath, Bangalore (IN); Abhishek Singh, Alambagh (IN); Tapesh Pawar, Bangalore (IN); Shameer Abdulkaderkunju, Alappuzha (IN); Bibith D. Dathan, Kottayam (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/536,580

(22) Filed: Aug. 9, 2019

(65) Prior Publication Data
US 2021/0042162 A1    Feb. 11, 2021

(51) Int. Cl.
*G06F 9/50*     (2006.01)
*G06N 20/00*    (2019.01)

(52) U.S. Cl.
CPC .......... *G06F 9/5038* (2013.01); *G06F 9/5055* (2013.01); *G06N 20/00* (2019.01)

(58) Field of Classification Search
CPC ....... G06F 2209/485; G06F 2209/5014; G06F 2209/5021; G06F 2209/504; G06F 9/50; G06F 11/3409; G06F 2209/5019; H04L 47/821
See application file for complete search history.

(56) References Cited

U.S. PATENT DOCUMENTS

| | | | |
|---|---|---|---|
| 5,168,570 A | * | 12/1992 | Eckert .................... G06F 8/433 710/241 |
| 8,938,542 B2 | | 1/2015 | Lynch |
| 8,972,551 B1 | | 3/2015 | Yanacek et al. |
| 9,164,802 B2 | | 10/2015 | Netto |
| 9,253,113 B2 | | 2/2016 | Vasudevan et al. |
| 9,258,197 B2 | | 2/2016 | Yanacek et al. |
| 9,450,838 B2 | | 9/2016 | Jain et al. |
| 9,471,384 B2 | | 10/2016 | Messerli |
| 10,110,511 B2 | | 10/2018 | Miller et al. |
| 2003/0046393 A1 | * | 3/2003 | Mueller ................. G06F 9/468 709/225 |

(Continued)

OTHER PUBLICATIONS

Mell et al., "The NIST Definition of Cloud Computing", NIST, Special Publication 800-145, Sep. 2011, pp. 1-7.

(Continued)

*Primary Examiner* — William G Trost, IV
*Assistant Examiner* — Christopher P Cadorna
(74) *Attorney, Agent, or Firm* — Scully, Scott, Murphy & Presser, PC; Ken Han, Esq.

(57) ABSTRACT

Determining priority of conflicting resource requests using dynamic logic includes analyzing current computer resource availability using cognitive capabilities and determining priority for the computer resources. The method may further include continuously assessing impact of the priority determinations, dynamically configuring the defined logic based on the assessment and modifying the defined logic using machine learning of effectiveness of the priority determinations. The method may also include predicting an urgency of the received computer resources requests and determining a pattern computer resource requests by users.

18 Claims, 9 Drawing Sheets

(56) References Cited

U.S. PATENT DOCUMENTS

| | | |
|---|---|---|
| 2009/0138883 A1 | 5/2009 | McLean |
| 2012/0102498 A1 | 4/2012 | Subramanya et al. |
| 2013/0132561 A1 | 5/2013 | Psala et al. |
| 2014/0200947 A1 | 7/2014 | Gujar et al. |
| 2014/0280961 A1 | 9/2014 | Martinez et al. |
| 2015/0020075 A1* | 1/2015 | Glew .................... G06F 9/4881 718/101 |
| 2018/0302340 A1* | 10/2018 | Alvarez Callau ....... H04L 47/76 |
| 2020/0293999 A1* | 9/2020 | Bhattacharya ......... G06N 20/00 |

OTHER PUBLICATIONS

Tsai et al., "Prioritizing Service Requests on Cloud with Multi-Tenancy", Nov. 10-12, 2010, pp. 117-124, IEEE 7th International Conference on E-Business Engineering, https://ieeexplore IEEE.org/abstract/document/5704284.

Sotomayor, Haizea and Private Clouds, Open Nebula, Feb. 19, 2009, pp. 5, https://opennebula.org/haizea-and-private-clouds/.

Lu, "Alliance Wise-PaaS IoT Software Platform", Advantech, Enabling an Intelligent Planet, Whitepaper, Feb. 21, 2017, pp. 1-36.

* cited by examiner

| Configuration Parameter | Custom Weightage |
|---|---|
| Fully consume resource 53 | 6 |
| Realtime resource utilization 49 | 5 |
| Years of relationship with the consumer 43 | 4 |
| Probability of consumer retention 45 | 3 |
| Frequency of resource requests 47 | 2 |
| SLA 41 | 1 |

FIG. 5

PRIORITY DETERMINATION OF COMPUTER RESOURCES BASED ON CONFIGURED DYNAMIC LOGIC

BACKGROUND OF THE INVENTION

This disclosure is directed to computers, and computer applications, and more particularly to computer-implemented methods and systems for determining priority of conflicting requests for computer resources A cloud service provider fulfils customer requests with the help of predefined information. Sometimes situations may arise when different departments of the same organization or different customers of the same contract level request a competing resource. In this situation there needs to be a mechanism in place to determine the request priority.

In some cloud providers use a set of pre-defined static rules to prioritize the backup requests. Such products are inefficient as they cannot not determine the actual priority based on real time conditions. One solution offers advance reservation of capacity and a configurable placement policy but does not address the problem of prioritizing the resource allocation for competing resources. Some cloud providers allocate resources to competing requests based on pre-defined resource allocation policies. Presently, most of the cloud providers rely on simple resource allocation policies like immediate best effort. Some cloud services provide computing resources on pay-per-use model. Some cloud administrators give priority based on a first come first serve method.

SUMMARY OF THE INVENTION

One embodiment of a computer implemented method for determining priority of conflicting requests for computer resources includes the steps of receiving conflicting requests for computer resources, analyzing current computer resource availability using cognitive capabilities and determining priority for the computer resources. The method may further include continuously assessing impact of the priority determinations, dynamically configuring the defined logic based on the assessment and modifying the defined logic using machine learning of effectiveness of the priority determinations. The method may also include predicting an urgency of the received computer resources requests and determining a pattern computer resource requests by users.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 is a chart of one embodiment of the priority configuration module disclosed in this specification.

DETAILED DESCRIPTION OF PREFERRED EMBODIMENTS

In one embodiment, there is disclosed a cognitive system and method for determining real time priority of conflicting resource requests in a cloud environment using an enterprise dynamic logic. One embodiment includes a priority engine that determines real time priority based on current environment analysis using cognitive capabilities. When multiple consumers make requests for a competing resource, the priority engine intercepts the requests to determine a priority of the incoming requests. The priority engine uses a set of defined logic to determine the priority for the order of satisfying the incoming requests.

The priority engine determines the priority based on dynamically configured logic. The priority engine provides a priority determination method that evolves continuously by assessing the impact of determining the priority and making changes to the enterprise priority determination logic. In one embodiment, the priority logic may be modified by learning from the effectiveness of determining the priority. The priority engine then passes the priority to a cloud service provider to fulfill the request.

Figure 1:
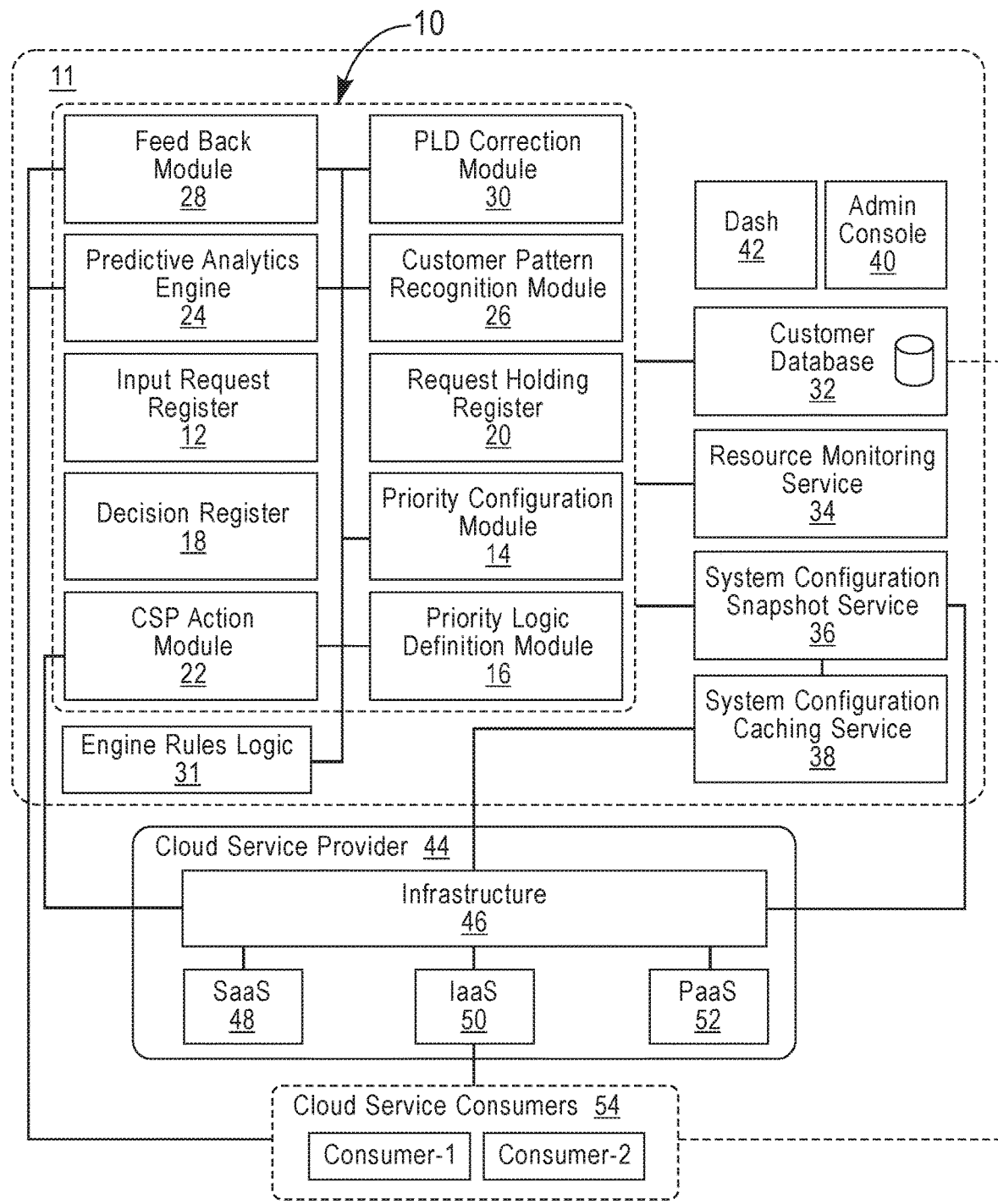
FIG. 1 is a block diagram of one embodiment of a priority determination system disclosed in this specification.

FIG. 1 depicts the components of one embodiment of the priority determination system 11. The system 11 includes a priority engine 10 which includes an input request register 12, a priority configuration module 14, a priority logic definition module 16, a decision register 18, a holding register 20, a cloud service provider action module 22, a predictive analytics engine 24 and a customer pattern recognition module 26. The priority engine 10 may also include a feedback module 28 and a priority logic definition correction module 30.

The priority logic definition module 16 defines the logic to determine the priority. For example, corporate service providers could define this module based on the corporate environment. The priority configuration module 14 is a custom configuration module for the priority engine. Service providers can define configuration parameters applicable to the specified environment. A list of parameters determining the priority could be defined in this module.

The input request register 12 records competing requests from consumers. The decision register 18 records the priority of incoming requests determined by the priority engine. The contents may be displayed in a visual dashboard. The holding register 20 records the pending requests after the priority engine determines the priority of incoming requests. The holding register 20 stores or holds pending requests, so they can be fulfilled later when resources becomes available. The cloud service provider action module 22 records actions for the cloud service provider in this register, such as fulfilling a request, additional resources requests, etc.

The predictive analytics engine 24 is used by the priority engine for predicting the urgency of submitted requests. The predictive analytics engine 24 may predict the consumption of a resource requested. For example, if two customers make a request for a competing CPU, the predictive analytics engine 24 could help the priority engine 10 to predict which consumer is going to overshoot the existing resource allocation. The priority engine 10 could use this analytical feature as an aid to determine the priority. This data may also used by the cloud service provider to better plan the resources.

The customer pattern recognition module 26 is used by the priority engine 10 to determine and record the customer requests pattern and to alert the cloud service provider for possible future requests. The priority engine 10 can use the request pattern to determine the priority. The cloud service provider can use the request pattern for better planning of resources. The engine rules logic 31 is configured by the priority configuration module 14, the priority logic definition module 16, the cloud service provider action module 22, the predictive analytics engine 24 and the customer pattern recognition module 26.

In one embodiment, priority engine 10 may include a feedback module 28 and a priority logic definition correction module 30 which offers an evolving capability to assess the impact of priority determination. The engine rules logic 31 is dynamically configured by the feedback module 28 and the priority logic definition correction module 30. Feed back module 28 is used for assessing the impact of priority determination. Feedback module 28 utilizes resource monitoring service 34 and snapshot services functionality 36 to provide this feed back mechanism. For example, out of two requests, priority engine 10 has fulfilled request number 1. Feed back module 28 monitors the impact of this priority determination and keeps an eye on the other request (which is not prioritized) to ensure there was no impact to the second system. If there was an impact, feedback module 28 provides an impact analysis, which could be used by the priority logic definition correction module 30 to make necessary changes to the priority determination logic. In short, feedback module 28 is used to determine the impact of priority determination by assessing the impact and by providing a feed back to the priority logic definition correction module 30.

The priority determination system 11 may also include a customer database 32, a resource monitoring service 34, a configuration snapshot service 36, a configuration cache service 38, an admin console 40, and a dashboard 42. The system 11 interacts with a cloud service provider 44 having cloud infrastructure 46 and cloud services SaaS 48, IaaS 50 and PaaS 52. Cloud service customers 54 includes multiple consumers such as consumer 1 and consumer 2.

The customer database 32 records customer details which will be referred by the priority logic definition module 16 to determine priority. The customer database 32 records information such as, customer name, type of contract, contract tenure, etc. The resource monitoring service 34 is used by the priority engine 10 to monitor the resource utilization and determines the realtime utilization of a resource. The configuration snapshot service 36 is used for taking a configuration snapshot of the system 11. The configuration cache service 38 is a caching service for capturing system configurations, which helps to alleviate network delays. The admin console 40 provides an administrative interface. The dashboard 42 provides a visual dashboard.

Figure 2:
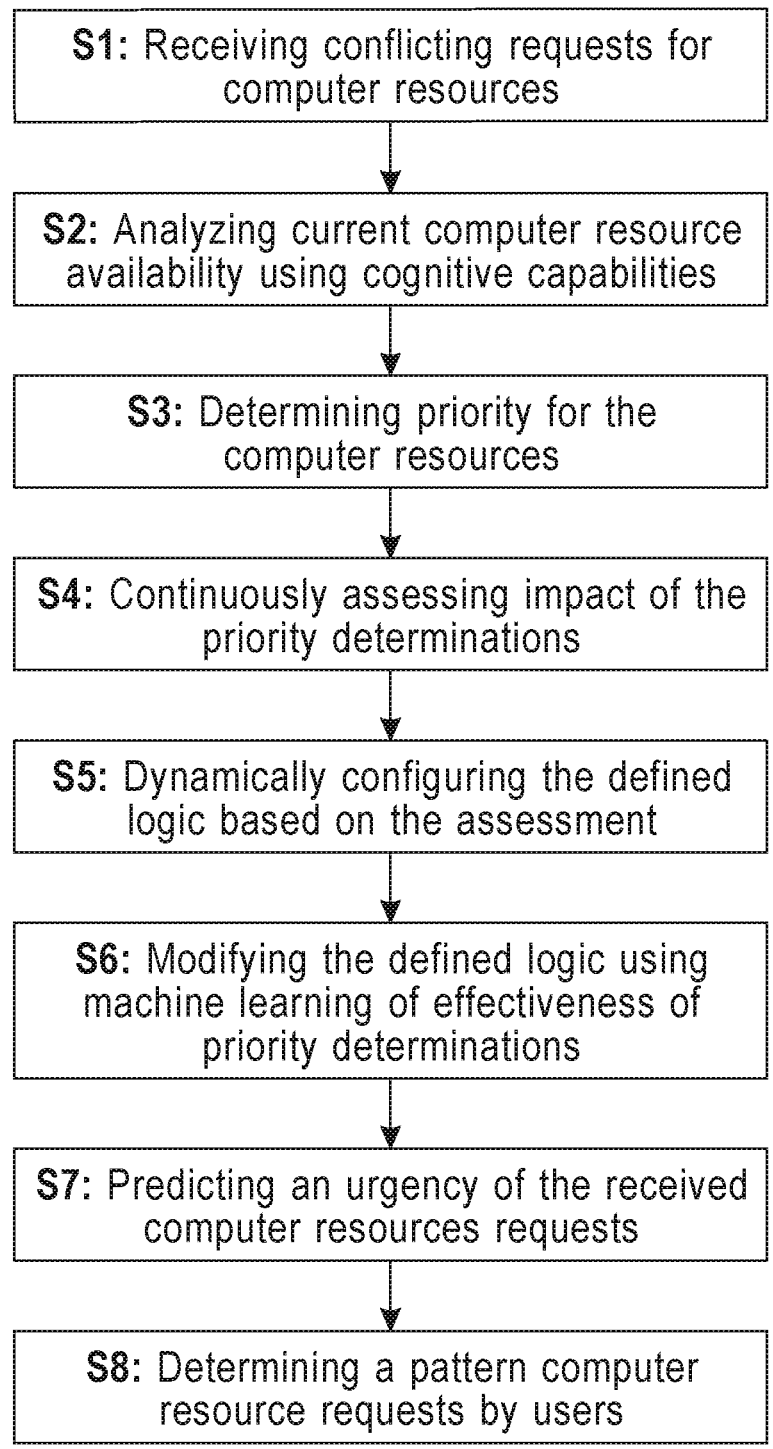
FIG. 2 is flow chart of one embodiment of a method for determining priority of conflicting requests for computer resources disclosed in this specification.

FIG. 2 is flow chart of one embodiment of a method for determining priority of conflicting requests for computer resources. The method starts with receiving conflicting requests for computer resources at step S1. Step S2 includes analyzing current computer resource availability using cognitive capabilities and step S3 includes determining priority for the computer resources. The method may further include step S4 of continuously assessing impact of the priority determinations, step S5 of dynamically configuring the defined logic based on the assessment and step S6 of modifying the defined logic using machine learning of effectiveness of the priority determinations. The method may also include step S7 of predicting an urgency of the received computer resources requests and step S8 of determining a pattern computer resource requests by users.

Figure 3:
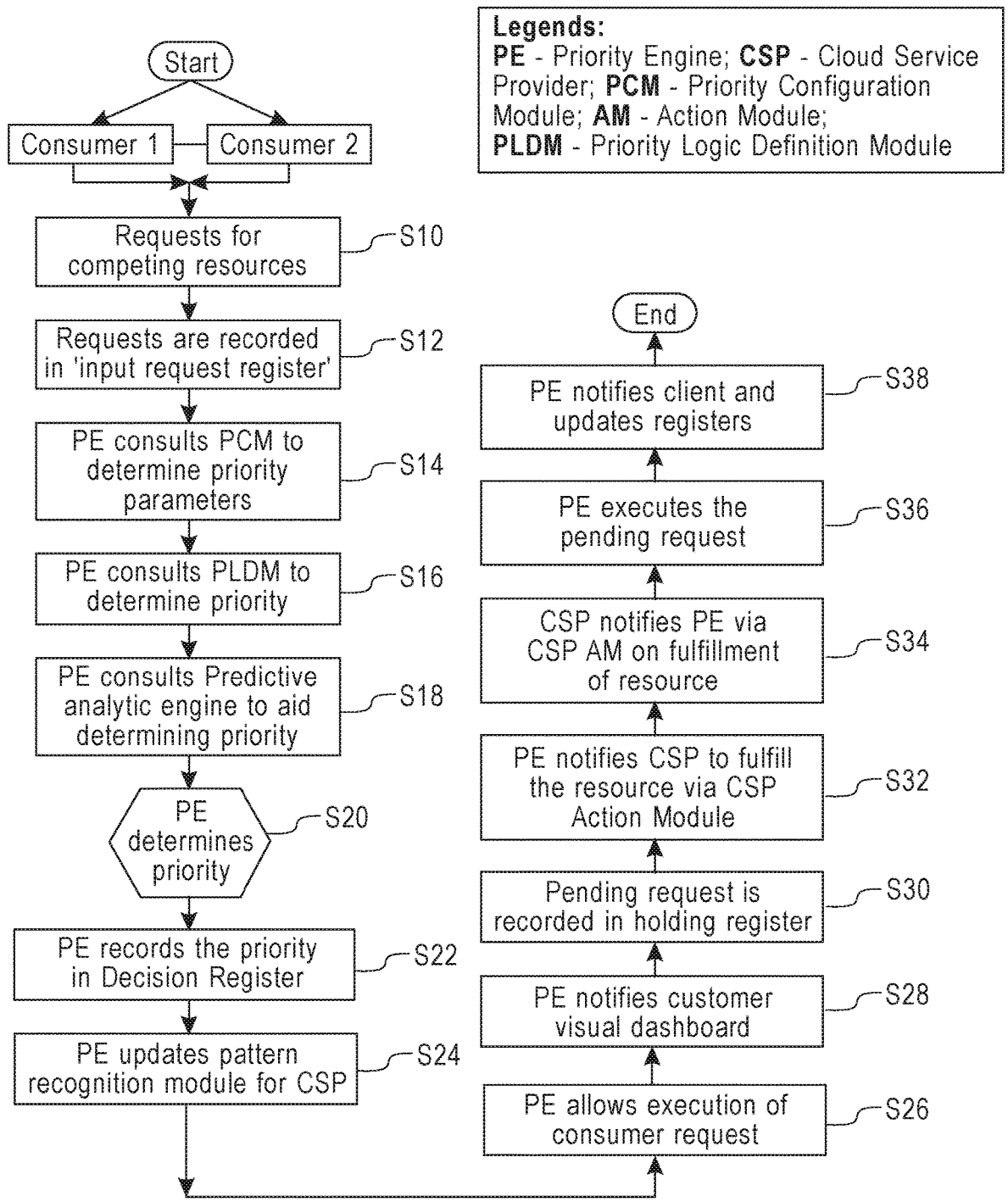
FIG. 3 is a flow chart of another embodiment of a method of determining priority disclosed in this specification.

FIG. 3 is a flow chart detailing the steps involved in one embodiment of determining priority based on the system diagram of FIG. 1. The process starts when consumer 1 and consumer 2 make requests for competing resources at step S10. The requests are recorded in input request register 12 at step S12. The priority engine 10 consults priority configuration module 14 to determine priority parameters at step S14. The priority engine 10 consults priority logic definition module 16 to determine the priority at step S16. The priority engine 10 consults predictive analytics engine 24 to aid determining priority at step S18. The priority engine 10 determines priority at step S20.

The priority engine 10 records the priority in the decision register 18 at step S22. The priority engine 10 updates the pattern recognition module 26 for the cloud service provider 44 at step S24. The priority engine 10 allows execution of consumer request at step S26. The priority engine 10 notifies the customer visual dashboard 42 at step S28.

The pending request is recorded in holding register at step S30. The priority engine notifies CSP to fulfill the resource via CSP action module 22 at step S32. The CSP notifies PE via CSP AM 22 on fulfillment of resource at step S34. The priority engine executes the pending request at step S36. The priority engine notifies client and updates registers at step S38.)

Figure 4:
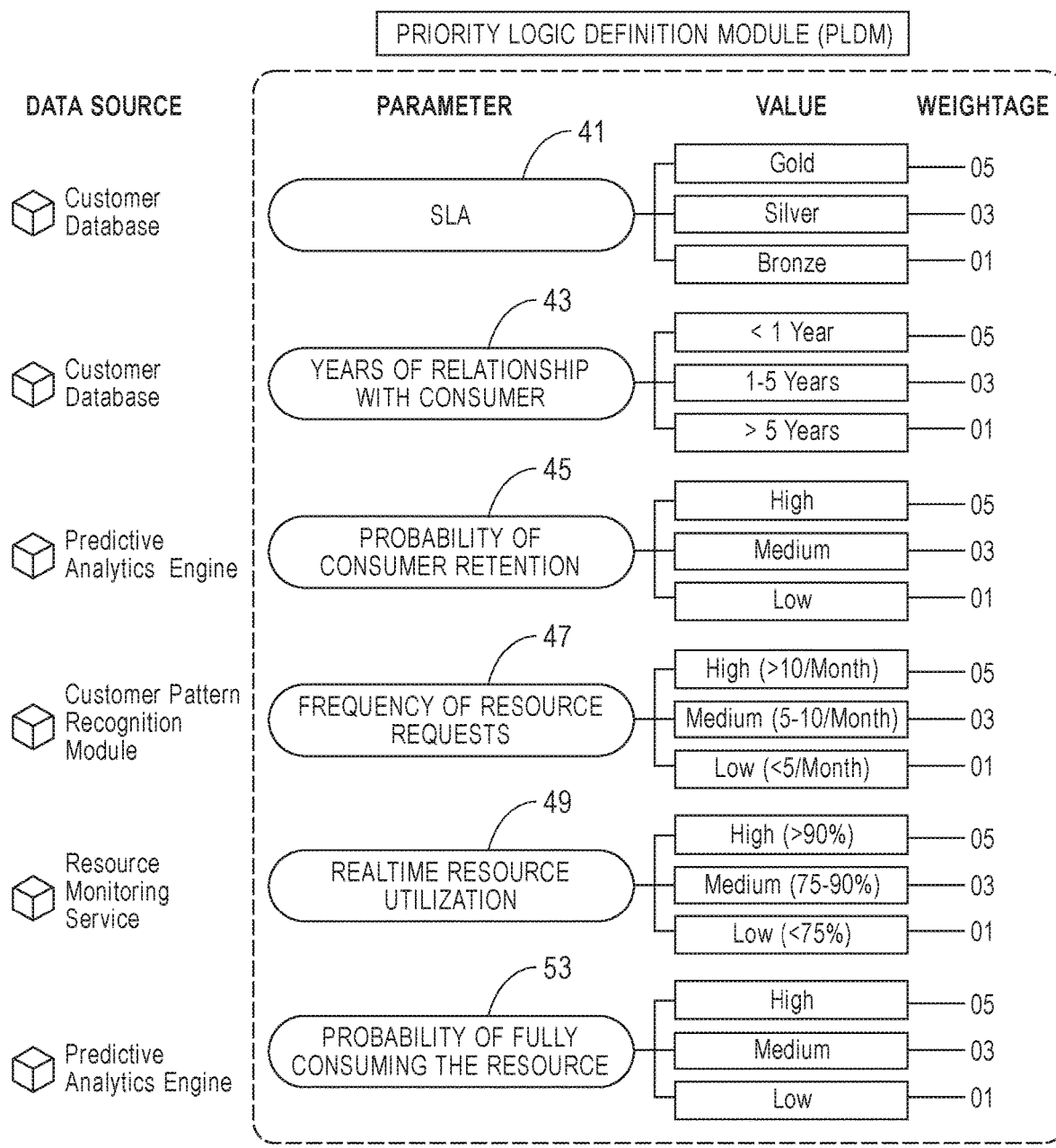
FIG. 4 is a chart for one embodiment of the priority logic definition module disclosed in this specification.

FIG. 4 is a chart for one embodiment of the priority logic definition module. The parameter SLA has values of gold with weightage 0.05, silver with weightage 0.03 and bronze with weightage 0.01. The data source for the SLA parameter is the customer database.

The parameter years of relationship with consumer has values of less than one year with a weightage 0.05; one to five years with a weightage 0.03; more than five years with a weightage 0.01. The data source for years of relationship with consumer is the customer database.

The parameter probability of consumer retention has values of high with a weightage of 0.05, medium with a weightage 0.03, low with a weightage of 0.01. The data source for probability of consumer retention is the predictive analytics engine.

The parameter frequency of resource requests has values of high, more than 10/month with a weightage 0.05; medium, 5-10/month with a weightage 0.03; low, less than 5 per month with a weightage 0.01. The data source for frequency of resource requests is the customer pattern recognition module.

The parameter realtime resource utilization has values of high, less than 90% with a weightage 0.05; medium 75-90% with a weightage 0.03, low, less than 75% with a weightage 0.01. The data source for parameter realtime resource utilization is the resource monitoring service.

The parameter probability of fully consuming the resource has values of high with a weightage 0.05; medium with a weightage 0.03, low with a weightage 0.01. The data source for probability of fully consuming the resource is the predictive analytics engine.

FIG. 5 is a chart of one embodiment of the priority configuration module. The configuration parameter fully consume resource has a custom weightage of 6. The realtime resource utilization has a custom weightage of 5. The years of relation with the consumer has custom weightage of 4. The probability of consumer retention has a custom weightage of 3. The frequency of resource requests has a custom weightage of 2. The SLA has a custom weightage of 1.

One embodiment of an algorithm for priority determination to compute and assign the priority for each request using the charts of FIGS. 4 and 5, includes the steps of:

Step 100: Assign requests from consumers to input registers:
k=Request from consumer-1
y=Request from consumer-2
Step 101: Read the priority configuration module for a list of parameters to be considered.
Step 102: Assign weightage to each of the parameter.
t_parameter [i]=value;
t_parm_weightage [i]=value (derived from the configuration module)
t_final_priority[i]=t_parameter*t_parm_weightage
Step 103: Add weightage of all the parameters:
sum [k]=t_final_priority[i]+t_final_priority[i . . . n]
sum [y]=t_final_priority[i]+t_final_priority[i . . . n]
Step 104: Determine which request has highest priority:
if sum[k]>sum[y];
allow execution of request k
else allow execution of request y.

Figure 6:
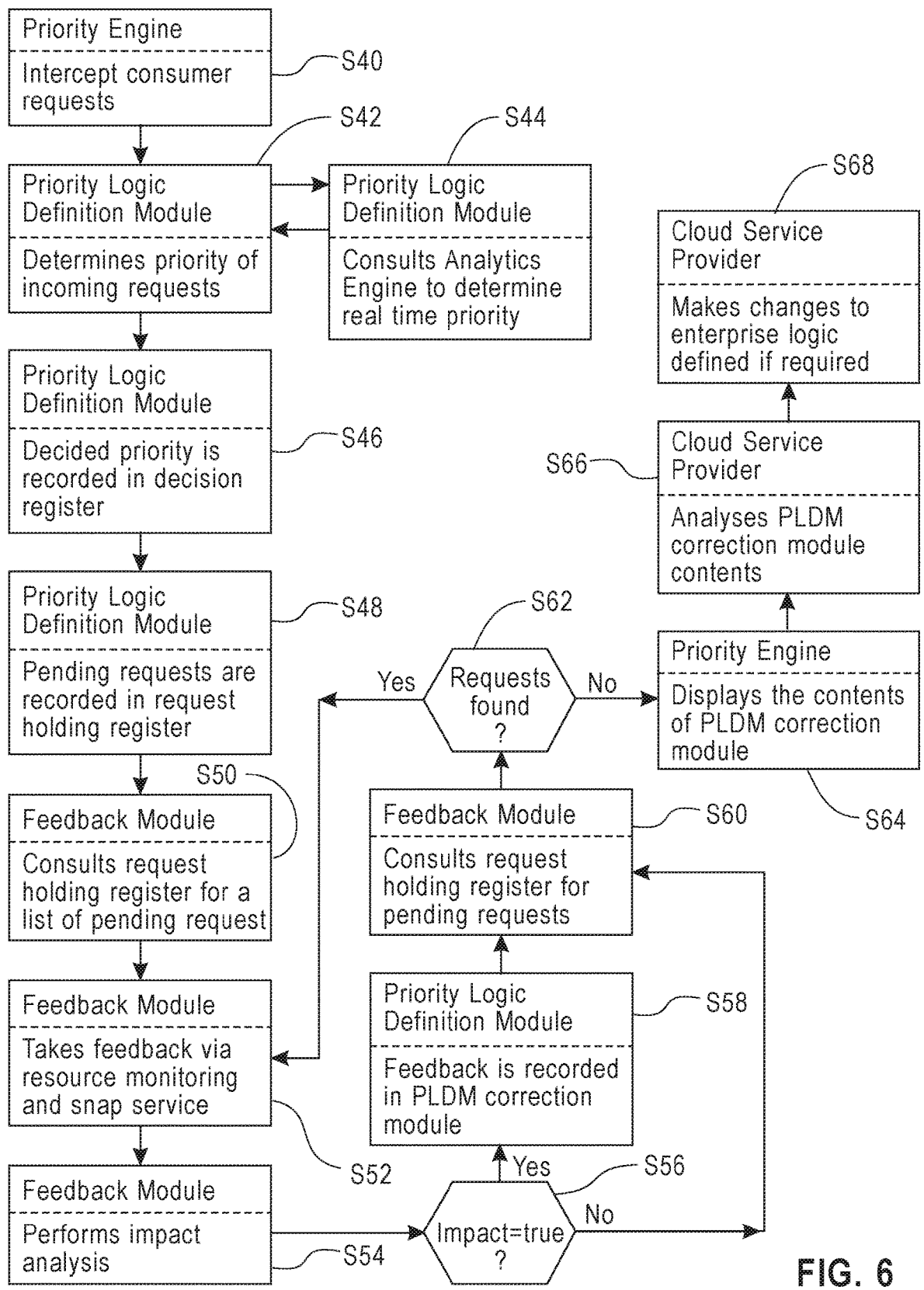
FIG. 6 is a flow chart for one embodiment of another method of determining priority disclosed in this specification.

FIG. 6 is a flow chart depicting one embodiment of steps involved in determining priority that includes the evolving feature provided by the feedback module. Priority Engine intercepts consumer requests at step S40. The priority logic definition module determines priority of incoming requests at step S42. The priority logic definition module consults the analytics engine to determine real time priority at step S44. The priority logic definition module decided priority is recorded in decision register at step S46. The priority logic definition module pending requests are recorded in request holding register at step S48. The feedback module consults request holding register for a list of pending request at step S50. The feedback module takes feedback via resource monitoring and snap service at step S52. The feedback module performs impact analysis at step S54. If the impact is True at decision block S56 the process moves to the priority logic definition module which records feedback is recorded in the correction module at step S58. If the impact is no True at decision block S56 the process moves to the feedback module which consults request holding register for pending requests at step S60. If Requests are found at decision block S62, the process moves back to S52 at the feedback module. If not requests are found at decision block S62, the process moves the priority engine which displays the contents of PLDM correction module at step S64. The cloud service provider analyzes the PLDM correction module contents at step S66. The cloud service provider makes changes to enterprise logic defined if required at step S68.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 7:
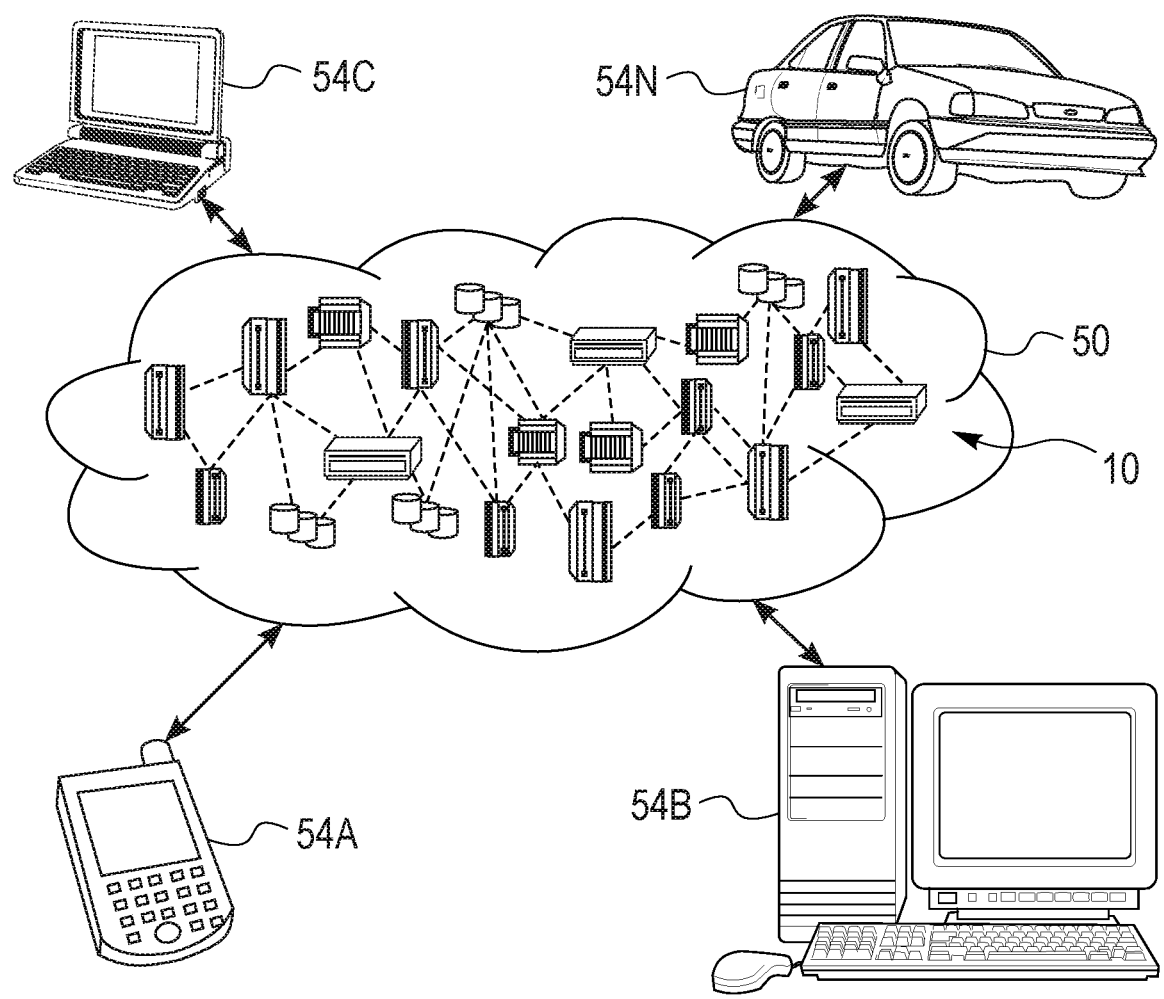
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
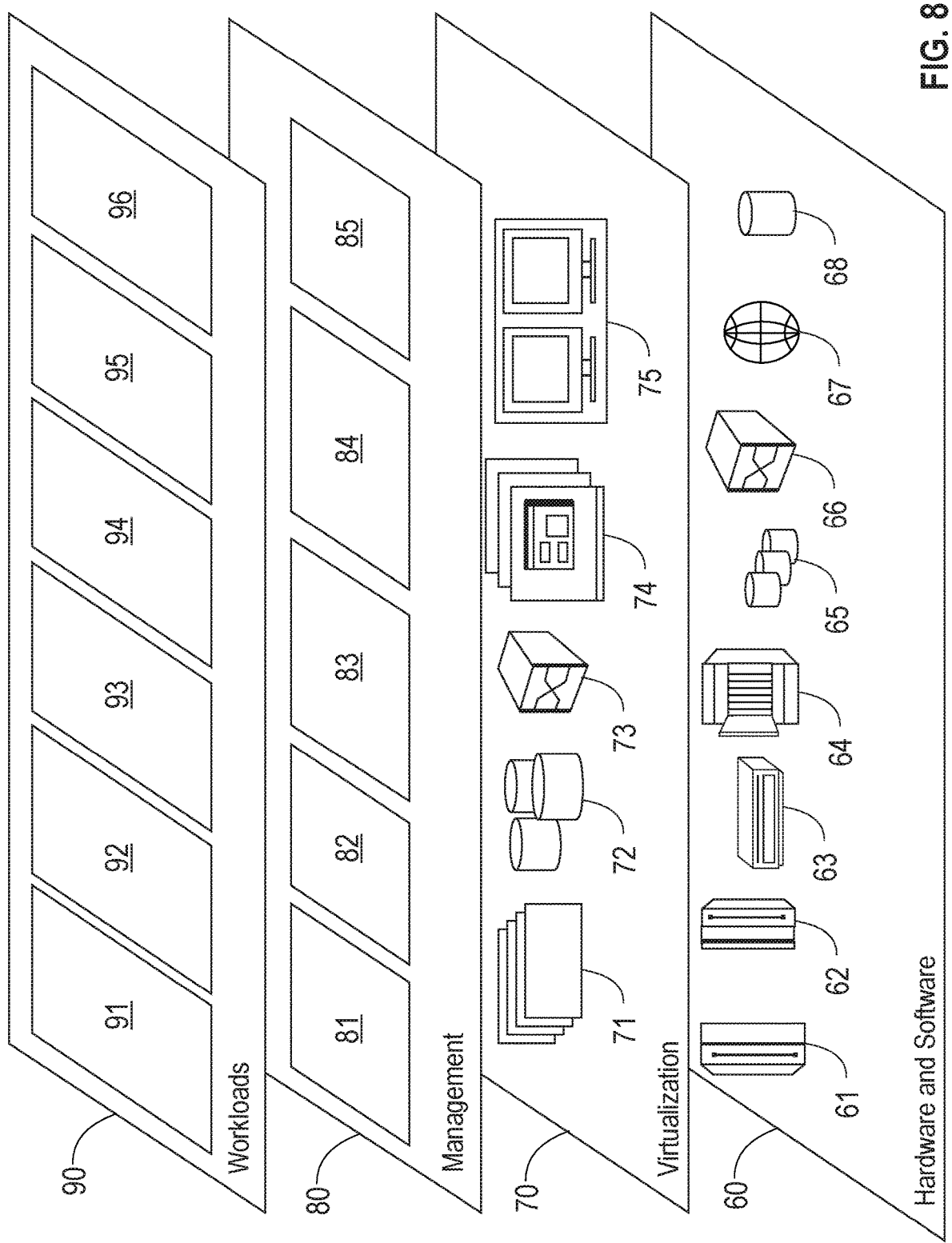
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for determining priority of conflicting requests for computer resources 96.

Figure 9:
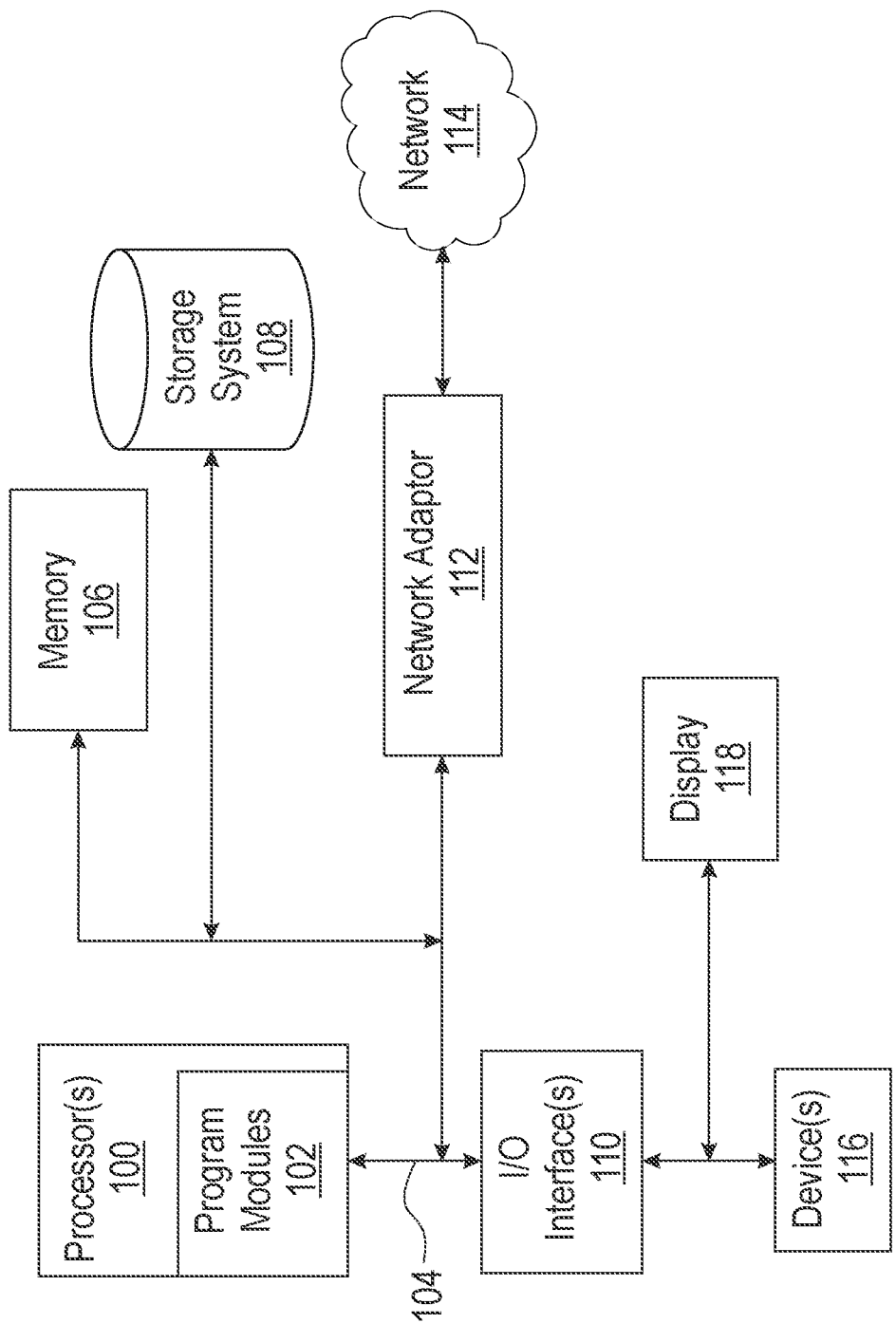
FIG. 9 is a block diagram of an exemplary computing system suitable for implementation of the embodiments of the invention disclosed in this specification.

FIG. 9 illustrates a schematic of an example computer or processing system that may implement the method for determining priority of conflicting requests for computer resources in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for determining priority of conflicting requests for computer resources, comprising:
receiving, at a priority engine, conflicting requests for computer resources from a plurality of users, the priority engine comprising a computer processor configured to perform;
analyzing current computer resource availability environment using cognitive capabilities to predict consumption of the requested resources and to determine request patterns of the plurality of users;
defining priority determination rules logic for use by the priority engine computer processor for automatically determining a priority for resource requests, the priority determination rules logic being defined based on configuration parameters defined in a priority configuration module;
continuously assessing an impact of one or more past priority determinations on the computer resources based on feedback from resource monitoring after the one or more past priority determinations and machine learning of effectiveness of the one or more past priority determinations;
dynamically modifying the priority determination rules logic based on the continuous assessment; and
automatically determining, using the dynamically modified priority determination rules logic, a priority for the received conflicting resource requests for providing the computer resources to the plurality of users based on the current computer resource availability environment, including the predicted consumption of the requested resources and the determined request patterns of the plurality of users.

2. The method of claim 1, wherein automatically determining the priority includes predicting an urgency of the received requests.

3. The method of claim 1, wherein the conflicting requests are for computer resources in a cloud environment.

4. A computer system for determining priority of conflicting requests for computer resources, comprising:
a priority engine comprising:
one or more computer processors;
one or more non-transitory computer-readable storage media; and
program instructions, stored on the one or more non-transitory computer-readable storage media, which when implemented by the one or more processors, cause the priority engine of the computer system to perform the steps of:

receiving, at the priority engine, conflicting requests for computer resources from a plurality of users, the priority engine comprising a computer processor configured to perform;

analyzing current computer resource availability environment using cognitive capabilities to predict consumption of the requested resources and to determine request patterns of the plurality of users;

defining priority determination rules logic for use by the priority engine computer processor for automatically determining a priority for resource requests, the priority determination rules logic being defined based on configuration parameters defined in a priority configuration module;

continuously assessing an impact of one or more priority determinations based on feedback from resource monitoring and machine learning of effectiveness of past priority determinations;

dynamically modifying the priority determination rules logic based on the continuous assessment; and automatically determining, using the dynamically modified priority determination rules logic, a priority for the received conflicting resource requests for providing the computer resources to the plurality of users based on the current computer resource availability environment, including the predicted consumption of the requested resources and the determined request patterns of the plurality of users.

5. The computer system of claim 4, wherein automatically determining the priority includes predicting an urgency of the received requests.

6. The computer system of claim 4, wherein the conflicting requests are for computer resources in a cloud environment.

7. A computer program product comprising:

program instructions on a computer-readable storage medium, where execution of the program instructions using a computer causes a priority engine of the computer to perform a method for determining priority of conflicting requests for computer resources, comprising:

receiving, at the priority engine, conflicting requests for computer resources from a plurality of users, the priority engine comprising a computer processor configured to perform;

analyzing current computer resource availability environment using cognitive capabilities to predict consumption of the requested resources and to determine request patterns of the plurality of users;

defining priority determination rules logic for use by the priority engine computer processor for automatically determining a priority for resource requests, the priority determination rules logic being defined based on configuration parameters defined in a priority configuration module;

continuously assessing an impact of one or more priority determinations based on feedback from resource monitoring and machine learning of effectiveness of past priority determinations;

dynamically modifying the priority determination rules logic based on the continuous assessment; and automatically determining, using the dynamically modified priority determination rules logic, a priority for the received conflicting resource requests for providing the computer resources to the plurality of users based on the current computer resource availability environment, including the predicted consumption of the requested resources and the determined request patterns of the plurality of users.

8. The computer system of claim 7, wherein automatically determining the priority includes predicting an urgency of the received requests.

9. The computer system of claim 7, wherein the conflicting requests are for computer resources in a cloud environment.

10. The method of claim 3, wherein a cloud service provider provides the requested computer resources based on the determined priority.

11. The method of claim 10, wherein a cloud service provider provides the requested computer resources further based on the predicted consumption of the requested resources.

12. The method of claim 10, wherein a cloud service provider provides the requested computer resources further based on the determined request patterns of the plurality of users.

13. The computer system of claim 4, wherein a cloud service provider provides the requested computer resources based on the determined priority.

14. The computer system of claim 13, wherein a cloud service provider provides the requested computer resources further based on the predicted consumption of the requested resources.

15. The computer system of claim 13, wherein a cloud service provider provides the requested computer resources further based on the determined request patterns of the plurality of users.

16. The computer program product of claim 7, wherein a cloud service provider provides the requested computer resources based on the determined priority.

17. The computer program product of claim 16, wherein a cloud service provider provides the requested computer resources further based on the predicted consumption of the requested resources.

18. The computer program product of claim 16, wherein a cloud service provider provides the requested computer resources further based on the determined request patterns of the plurality of users.

* * * * *